(12) United States Patent
Kang et al.

(10) Patent No.: US 10,505,468 B2
(45) Date of Patent: Dec. 10, 2019

(54) SYSTEM AND METHOD FOR SUPPLYING POWER TO AT LEAST ONE LOAD

(71) Applicant: General Electric Company, Schenectady, NY (US)

(72) Inventors: Pengju Kang, Shanghai (CN); Xueqin Wu, Shanghai (CN); Yingqi Zhang, Shanghai (CN); Zhuohui Tan, Shanghai (CN); Ming Su, Shanghai (CN)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 15/535,108

(22) PCT Filed: Dec. 11, 2015

(86) PCT No.: PCT/US2015/065147
§ 371 (c)(1),
(2) Date: Jun. 12, 2017

(87) PCT Pub. No.: WO2016/094747
PCT Pub. Date: Jun. 16, 2016

(65) Prior Publication Data
US 2017/0353123 A1 Dec. 7, 2017

(30) Foreign Application Priority Data
Dec. 12, 2014 (CN) .......................... 2014 1 0768134

(51) Int. Cl.
*H02M 7/217* (2006.01)
*H02J 3/14* (2006.01)
(Continued)

(52) U.S. Cl.
CPC ............... *H02M 7/217* (2013.01); *H02J 3/14* (2013.01); *H02J 3/28* (2013.01); *H02J 3/32* (2013.01);
(Continued)

(58) Field of Classification Search
CPC .......... H02J 7/0052; H02J 3/14; H02J 7/0063; H02M 2007/4835; H02M 1/08;
(Continued)

(56) References Cited

U.S. PATENT DOCUMENTS 6,359,442 B1 * 3/2002 Henningson ....... G01R 31/3648
324/426
6,831,449 B2 12/2004 Nishida et al.
(Continued)

FOREIGN PATENT DOCUMENTS

CN        101807799 A      8/2010
CN        102751776 A     10/2012
(Continued)

OTHER PUBLICATIONS

"Gas Engine Power for Drilling," Caterpillar, pp. 1-27 (2010).
(Continued)

*Primary Examiner* — Jared Fureman
*Assistant Examiner* — Duc M Pham
(74) *Attorney, Agent, or Firm* — Armstrong Teasdale LLP

(57) ABSTRACT

It is a system for supplying power to at least one load. The system comprises at least one power source, load bank and control device coupled to the at least one load. The load bank is coupled to at least one power source and at least one load. The load bank comprises a controllable voltage source, at least three resistors coupled between an output side of the controllable voltage source and the at least one power source, and at least one storage element. The controllable voltage source comprises more than one switches. And the at least one storage element comprises one or more capacitors, batteries, or combinations thereof. The control device is configured for controlling the switches during a first condition such that, to the extent that an output power of the at least one power source exceeds a requisite power of the at
(Continued)

least one load, any excess output power is either supplied to the at least one storage element or consumed by the at least three resistors. This invention also provides a method for supplying power to at least one load.

19 Claims, 7 Drawing Sheets

(51) Int. Cl.

| | |
|---|---|
| H02J 3/28 | (2006.01) |
| H02J 3/32 | (2006.01) |
| H02J 7/00 | (2006.01) |
| H02M 1/08 | (2006.01) |
| H02M 7/539 | (2006.01) |
| H02M 7/487 | (2007.01) |
| H02M 7/5387 | (2007.01) |
| H02M 7/483 | (2007.01) |
| H02J 7/34 | (2006.01) |
| H02M 1/00 | (2006.01) |

(52) U.S. Cl.
CPC .......... *H02J 7/0052* (2013.01); *H02J 7/0063* (2013.01); *H02M 1/08* (2013.01); *H02M 7/539* (2013.01); *H02J 7/345* (2013.01); *H02M 7/487* (2013.01); *H02M 7/53871* (2013.01); *H02M 2001/0048* (2013.01); *H02M 2007/4835* (2013.01); *Y02B 70/3225* (2013.01); *Y04S 20/222* (2013.01)

(58) Field of Classification Search
CPC .......... H02M 7/217; H02M 2001/0048; H02M 7/487; Y02B 70/3225; Y04S 20/222
See application file for complete search history.

(56) References Cited

U.S. PATENT DOCUMENTS

| | | | |
|---|---|---|---|
| 7,045,913 B2 | 5/2006 | Ebrahim et al. | |
| 8,242,629 B2 | 8/2012 | Palatini et al. | |
| 8,631,275 B2 | 1/2014 | Opina, Jr. et al. | |
| 2002/0110717 A1* | 8/2002 | Basel | H01M 8/04007 429/429 |
| 2005/0134248 A1 | 6/2005 | Locker et al. | |
| 2011/0044077 A1 | 2/2011 | Nielsen | |
| 2012/0223524 A1 | 9/2012 | Williams | |
| 2012/0292992 A1* | 11/2012 | Williams | F02D 19/10 307/23 |
| 2014/0111167 A1 | 4/2014 | Hyypio et al. | |

FOREIGN PATENT DOCUMENTS

| | | |
|---|---|---|
| CN | 203734323 U | 7/2014 |
| WO | 2013/066486 A1 | 5/2013 |

OTHER PUBLICATIONS

Gong, B., et al., "Cost Effective Method for DFIG Fault Ride-through During Symmetrical Voltage Dip," 36th annual conference on IEEE industrial electronics society, pp. 3269-3274 (2010).

Ion, C.P., et al., "Parallel Operation of Micro Hydro Power Plants," 7th International Symposium Onadvanced Topics in Electrical Engineering, pp. 1-6 (2011).

Klumpner, C., et al., "A Power Electronic Controlled Dump Load with Negligible Harmonics for Accurate Loading Used in Testing Small Wind Turbines," International Symposium on Industrial Electronics, pp. 596-601 (2010).

Marinescu, C and Serban, I., "Analysis of Frequency Stability in a Residential Autonomous Microgrid Based on a Wind Turbine and a Microhydro Power Plant," Power Electronics and Machines in Wind Applications, pp. 1-6 (2009).

International Search Report and Written Opinion issued in connection with corresponding PCT Application No. PCT/US2015/65147 dated Apr. 1, 2016.

International Preliminary Report on Patentability issued in connection with corresponding PCT Application No. PCT/US2015/65147 dated Jun. 13, 2017.

Machine translation and First Office Action and Search issued in connection with corresponding CN Application No. 201410768134.8 dated Sep. 4, 2017.

* cited by examiner

SYSTEM AND METHOD FOR SUPPLYING POWER TO AT LEAST ONE LOAD

TECHNOLOGY FIELD

This invention involves the field of electronic technology, particularly a system and a method for supplying power to at least one load.

BACKGROUND TO THE INVENTION

In oil well drilling operation, the drill consumes plenty power mainly by the winch, mud pump, top drive device and rotary table. In common drilling operation, one or more power sources are configured to the winch, mud pump, top drive device and rotary table of the drill for supplying average power. The one or more power sources can be diesel generator, gas generator or hybrid generator etc.

In operations like bit lifting (for example, if the bit is damaged, or when a bit replacement is required to fit the different rock formation, it is necessary for the winch to lift the drill pipe and the bit out of the well for bit replacement), the winch consumes much more power such that the power source needs to supply a peak power to the winch instantaneously. However, the existing power source fails to provide peak power instantaneously due to its slow response speed.

The first solution to the technical problem of slow response speed of the existing power source is to raise the output power of power source drastically in advance. For example, in the preparation condition of bit lifting, raise the output power of the power source drastically to the first peak power. Since the requisite power of the winch is still average power at the time, a load bank must be configured to consume the power difference between the power source output power and the requisite power of the winch by heat consumption to achieve energy conservation.

In the bit lifting condition, raise the power source output power instantaneously from the first peak power to the second peak power. The requisite power of the winch increases from the average power to the peak power instantaneously such that, the problem of slow power source response speed is solved.

However, the existing load bank comprises more than one mechanical switches and resistors, wherein the service life of such switches are relatively short and the resistors are excessive. Additionally, the mechanical switches are discrete so that, they fail to regulate the power consumption of the load bank continuously.

One of the solutions to the problem of the shorter service life of mechanical switches is to replace the switches with electronic ones. However, the electronic switches cannot be controlled by soft switching, which brings new problems of noise and harmonic wave.

In addition, the load bank can only consume the power by its resistors instead of supplying power.

The second solution to the technical problem of slow response speed of the existing power source is to redesign the power source to raise the response speed. However, the redesign of a power source with faster response speed is time-consuming, complicate and costly.

SUMMARY OF INVENTION

To facilitate a basic understanding of the present invention, an induction of one or more aspects of the present invention is to be provided, in which the induction is not an extended overview of the present invention, and is not intended to identify some of the elements or the scope of the present invention. The main purpose is to present some concepts in a simplified form before presenting more detailed description of the present invention.

On one hand, the present invention provides a system for supplying power to at least one load. The at least one load is coupled to at least one power source. The system comprises:

a load bank coupled to at least one power source and at least one load;

and control device;

The load bank comprises a controllable voltage source, at least three resistors coupled between an output side of the controllable voltage source and the at least one power source, and at least one storage element. The controllable voltage source comprises more than one switches, and the at least one storage element comprises one or more capacitors, batteries, or combinations thereof;

The control device is configured for controlling the switches during a first condition such that, to the extent that an output power of the at least one power source exceeds a requisite power of the at least one load, any excess output power is either supplied to the at least one storage element or consumed by the at least three resistors.

Optimally, in the claimed system, the controllable voltage source comprises a DC to AC conversion unit.

On the other hand, the present invention provides a method for supplying power to at least one load that is coupled to at least one power source. The at least one load and the at least one power source are both coupled to a load bank; and the load bank comprises a controllable voltage source comprising more than one switches, at least three resistors coupled between an output side of the controllable voltage source and the at least one power source, and at least one storage element comprising one or more capacitors, batteries, or combinations thereof. The method comprises:

controlling the switches during a first condition such that, to the extent that an output power of the at least one power source exceeds a requisite power of the at least one load, any excess output power is either supplied to the at least one storage element or consumed by the at least three resistors.

The present invention provides a system for supplying power to at least one load. The at least one load is coupled to at least one power source. The system comprises:

a load bank coupled to at least one power source and the at least one load;

and control device;

the load bank comprises a controllable voltage source comprising more than one switches and at least three resistors coupled between an output side of the controllable voltage source and the at least one power source;

the control device is for controlling the switches during a first condition such that, to the extent that an output power of the at least one power source exceeds a requisite power of the at least one load, any excess output power is consumed by the at least three resistors.

On one hand, the present invention provides a system for supplying power to at least one load. The at least one load is coupled to at least one power source. The system comprises:

a load bank coupled to the at least one power source and the at least one load;

and control device;

the load bank comprises a controllable voltage source comprising more than one switches and at least one storage element comprising one or more capacitors, batteries, or combinations thereof; the output side of the controllable voltage source is coupled to at least one power source, and the at least one storage element is coupled to the input side of the controllable voltage source;

the control device for controlling the switches during a first condition such that, to the extent that an output power of the at least one power source exceeds a requisite power of the at least one load, any excess output power is supplied to the at least one storage element.

The present invention provides a system and a method for supplying power to at least one load, wherein the number of resistors in the load bank is reduced to at least three resistors, such that the problem of excess resistors is solved. Additionally, the controllable voltage source in the load bank comprises more than one electronic switches of long service life such that, the technical problem of shorter service life of mechanical switches is solved. Thirdly, the electronic switches of the controllable voltage source in the load bank are continuous and function fast, which enables them to regulate the power consumption of the load bank continuously and rapidly, such that the other problem of the existing technology is solved, wherein the discrete mechanical switches fail to regulate the power consumption of the load bank continuously and rapidly.

BRIEF DESCRIPTION OF THE DRAWINGS

To understand better the embodiments of the present invention, the drawings of the present invention are attached, in which.

DETAILED DESCRIPTION OF THE INVENTION

The following will describe specific embodiments of the present invention. It is noted that, to carry out a concise description of these embodiments, it is not possible for this Specification to cover all features of an actual embodiment. It should be understood that, in the actual implementation process of any embodiment, just as in the course of any engineering project or design project, in order to achieve the developers' specific goals, and in order to meet business-related or system-related restrictions, a variety of specific decisions are made often, and this will change one embodiment to another embodiment. In addition, it will also be understood that, although the efforts made in this development process can be complicated and lengthy, for those people with general skills in the field related to the disclosed content of present invention, changes could be made to the designs, manufacturing or production on the basis of the publicly disclosed content with regular technologies. Therefore, it should not be deemed as that the disclosure is not sufficient.

Unless otherwise defined, technical jargon or scientific terms used in this Claims and Specifications shall be reasonably expected to be understood by the person with general technical skills in the related field of present invention. Throughout this patent application specification and claims, "first", "second" and similar words do not denote any order, quantity, or importance, but are used to distinguish the different components. "A" or "a" and similar words do not mean a single unit, but indicate the presence of at least one. "Includes" or "including" and other similar words mean to point out that the elements or objects in front of "includes" or "including" cover the enumerated elements or objects appearing after "includes" or "including" and their equivalents element, without excluding other elements or objects. "Connection" or "connected" and other similar words are not limited to physical or mechanical connections, but may include electrical connections, whether direct or indirect.

Figure 1:
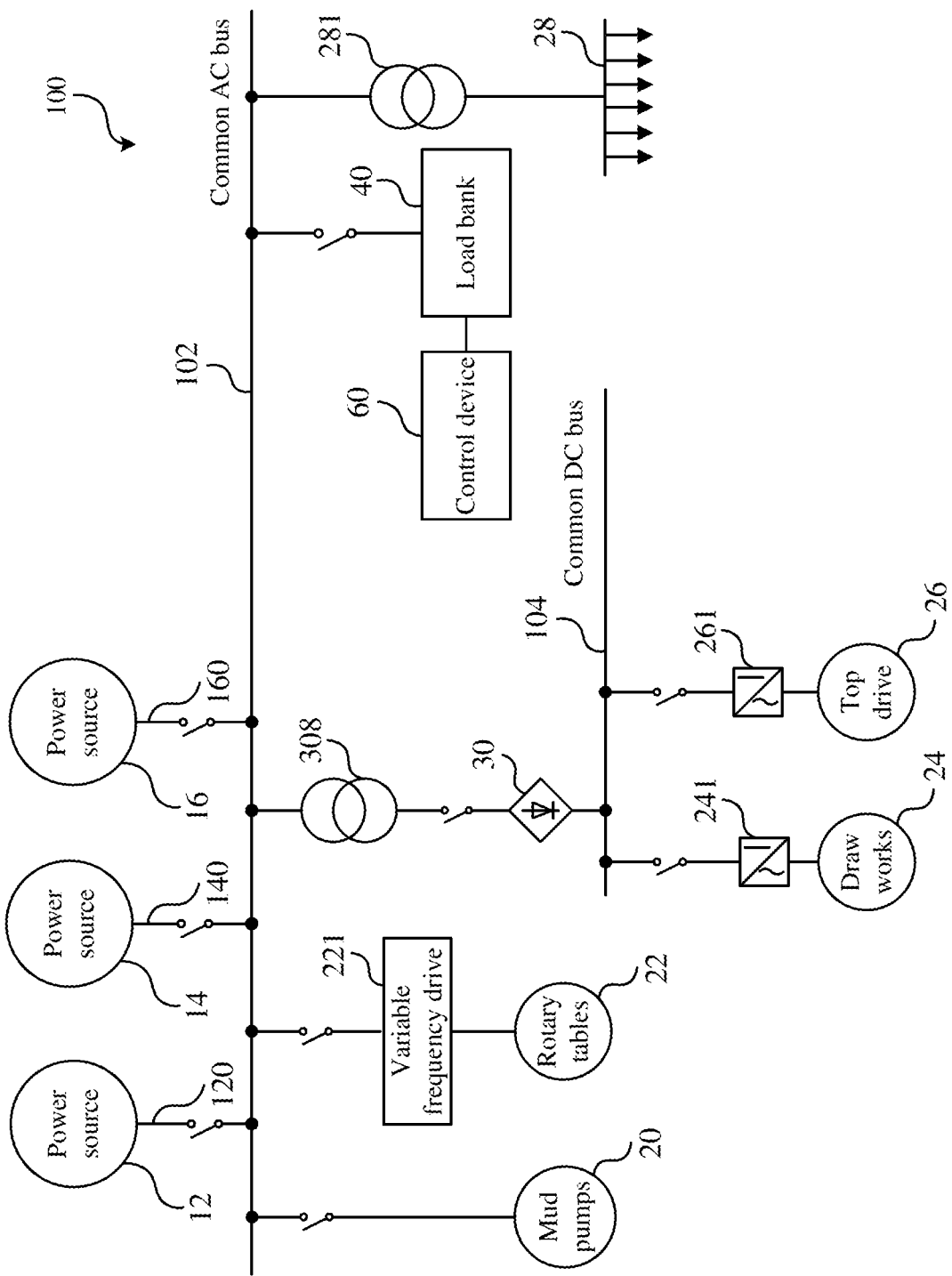
FIG. 1 is a circuit diagram of an embodiment, wherein a system supplies power to the drill load.

Please refer to FIG. 1, the circuit diagram of System 100 of an embodiment. System 100 is configured to supply power to the four loads, 20, 22, 24 and 26 of the drill (not shown in the figure). In other cases, System 100 may be configured to supply power to other loads (the loads other than drill).

Although the drill shown in FIG. 1 comprises four loads, in other cases, the number of drill loads can be one, two, three, four or more.

System 100 comprises three power sources, 12, 14 and 16, the common AC bus 102, common DC bus 104, load bank 40 and control device 60. It can be understood that, although there are three power sources shown in FIG. 1, in other embodiments, the number of power sources can be one, two, three or more.

The three power sources 12, 14 and 16 are connected to common AC bus 102 in a switchable manner. The three power sources 12, 14 and 16 transmit AC power to common AC bus 102 through respective output cables 120, 140 and 160. In infinite cases, the three power sources 12, 14 and 16 may include diesel generator, gas generator and hybrid generator. The fuel gas may be natural gas and the hybrid fuel may be combination of diesel and gas, etc.

System 100 is further configured to supply power to hotel load 28 of the drill. The hotel load 28 of the drill is connected to common AC bus 102 in a switchable manner. The common AC bus 102 is configured to supply AC power to the hotel load 28 of the drill. In infinite cases, hotel load 28 may include air conditioner, heating device, lighting device and other drill devices with power demands.

System 100 also comprises transformer 281. Transformer 281 is coupled between common AC bus 102 and hotel load 28. As an infinite case, transformer 281 may be configured to reduce the voltage (for example, voltage of 600V) of AC power of common AC bus 102 and transmit the AC power at reduced voltage (for example, voltage of 380V) to hotel load 28.

The four loads 20, 22, 24 and 26 of the drill are connected to common DC bus 104 in a switchable manner. In infinite cases, load 20 may be mud pump; load 22 rotary table; load 24 winch; and load 26 top drive device. Load 20 may be directly coupled to the common AC bus 102 through a switch.

System 100 also comprises transducer 221. Transducer 221 is coupled between common AC bus 102 and load 22. Transducer 221 is configured to transform the AC power of the common AC bus 102 from one frequency to another frequency. The power of another frequency will be supplied to load 22.

System 100 also comprises rectifying unit 30 and two DC to AC conversion units 241 and 261. The rectifying unit 30 is coupled between the common AC bus 102 and the common DC bus 104 in a switchable manner. The rectifying unit 30 is configured to transform the AC power of the common AC bus 102 to DC power. The DC power will be supplied to the common DC bus 104. DC to AC conversion units 241 and 261 are coupled between the load 24, load 26 and the common DC bus 104 respectively. DC to AC conversion units are configured to transform the DC power of the common DC bus 104 to AC power, which will be supplied to corresponding loads. It can be understood that, although there are two DC to AC conversion units shown in FIG. 1, in other embodiments, the number of DC to AC conversion units can be one or more than two.

System 100 also comprises transformer 308. Transformer 308 is coupled between the common AC bus 102 and the rectifying unit 30. In an infinite case, transformer 308 may be configured to reduce the voltage (for example, voltage of 600V) of AC power of common AC bus 102 and transmit the AC power at reduced voltage to rectifying unit 30.

In FIG. 1, load bank 40 is connected to the common AC bus 102 through a switch. Control device 60 is coupled to load bank 40.

Figure 2:
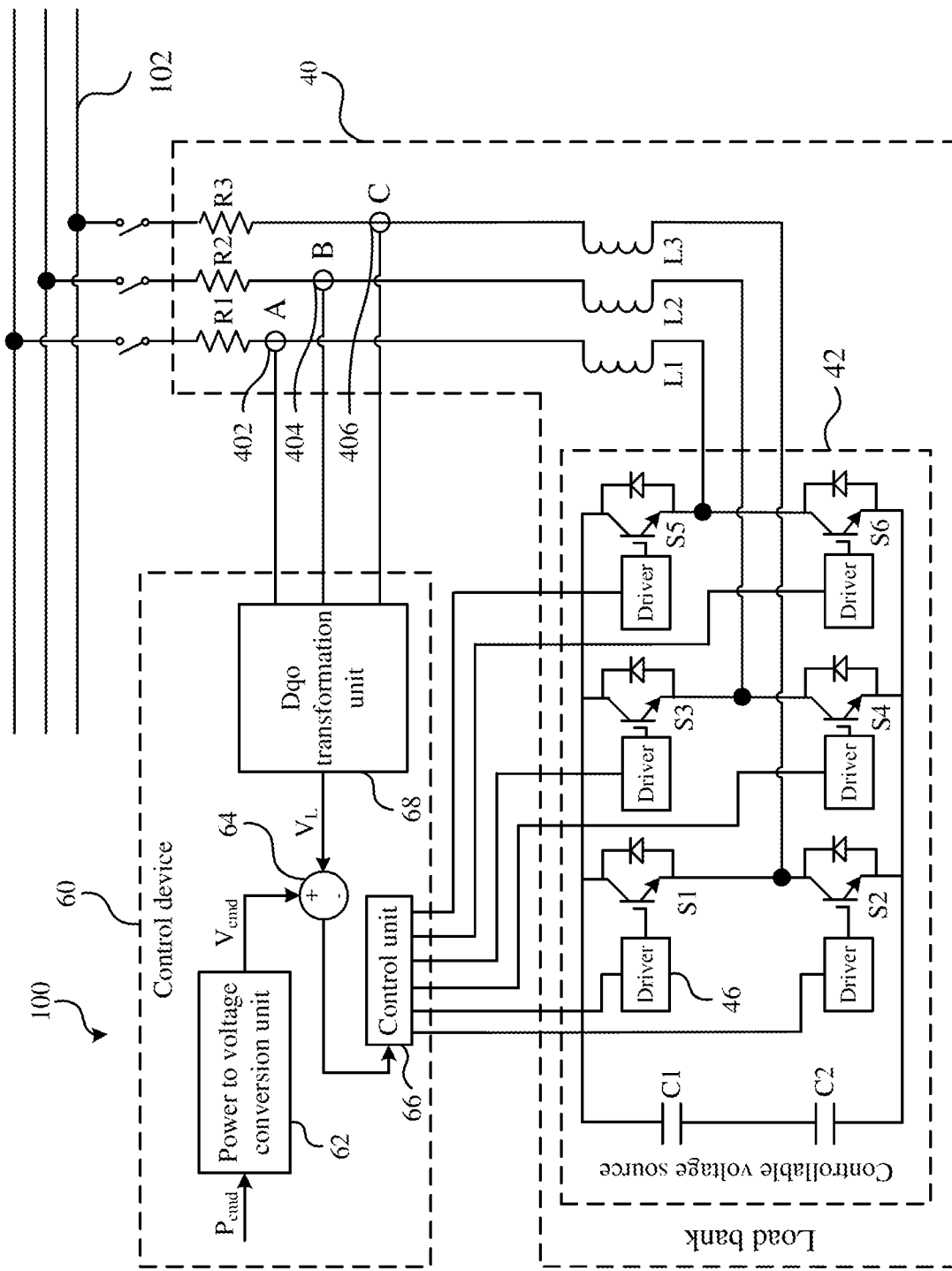
FIG. 2 is a circuit diagram of the load bank and the control device in the first embodiment.

Please refer to FIG. 2 as well, the circuit diagram of load bank 40 of the first embodiment. Load bank 40 comprises three resistors R1, R2 and R3 and a controllable voltage source 42. The controllable voltage source 42 comprises six switches S1, S2, S3, S4, S5, S6 and two capacitors C1 and C2. The controllable voltage source 42 is a DC to AC conversion unit, wherein the six switches S1, S2, S3, S4, S5, S6 and the two capacitors C1 and C2 constitute a DC to AC conversion unit through publicly known electronic coupling.

Although the controllable voltage source 42 comprises six switches S1, S2, S3, S4, S5 and S6 as shown in FIG. 2, it can be understood that, in other cases, the controllable voltage source 42 may comprise more or less than six switches. In addition, in other embodiments, load bank 40 may comprise more than three resistors.

The three resistors R1, R2 and R3 are coupled between the common AC bus 102 and the output side of controllable voltage source 42. Specifically, the three resistors R1, R2 and R3 are respectively coupled between the three output phase lines 112, 122 and 132 of common AC bus 102 and the output side of controllable voltage source 42.

Control device 60 is configured for controlling the six switches S1, S2, S3, S4, S5 and S6 during a first condition such that, to the extent that the output powers of the three power sources 12, 14 and 16 exceed the requisite powers of the four loads 20, 22, 24 and 26, any excess output power is consumed by the three resistors R1, R2 and R3.

Control device 60 is also configured to disconnect the six switches S1, S2, S3, S4, S5 and S6 during the second condition such that, the controllable voltage source 42 can be disabled.

The requisite power of the load in the first condition has a large fluctuation, which is beyond the dynamic response capacity of the power source. The first condition may refer to wherein the output power of the power source exceeds the requisite power of the load, or wherein the requisite power of the load exceeds the output power of the power source.

The output power of the load in the second condition has a smaller fluctuation, or the requisite power of the load has a smaller fluctuation (System 100 functions stably).

As an infinite explanation, the first condition may specifically refer to the loading condition, for example, the condition wherein winch 20 lifts or lowers the bit such that, the requisite powers of the four loads 20, 22, 24 and 26 increases instantaneously. The second condition may refer to pre-loading condition, for example, the condition wherein winch 20 prepares to lift or lower the bit.

As an infinite explanation, in the pre-loading condition, the output power of the power source is 700 KW. The requisite power of the drill load (for example, winch 20) is 400 KW. The three resistors R1, R2 and R3 in load bank 40 consume 300 KW power by heat consumption to achieve energy conservation.

In loading condition, the output power of the power source increases from 700 KW to 800 KW, and the requisite power of the drill load (for example, winch 20) increases from 400 KW to 800 KW. As the controllable voltage source 42 in load bank 40 is disabled, the three resistors R1, R2 and R3 in load bank 40 stop consuming the power.

In this embodiment, there are only three resistors R1, R2 and R3 configured in load bank 40, which is a relatively small number. Therefore, the problem of the number of resistors in the load bank is solved.

Additionally, in this embodiment, six switches S1, S2, S3, S4, S5 and S6 are used for load bank 40 and the service lives of the six switches S1, S2, S3, S4, S5 and S6 are relatively longer. Therefore, the technical problem of shorter service life of mechanical switch is solved. Furthermore, the controllable voltage source 42 is a DC to AC conversion unit comprising six switches S1, S2, S3, S4, S5 and S6. The six switches S1, S2, S3, S4, S5 and S6 may be turned on and off by soft switching with control device 60. The problems of noise and harmonic wave are solved thereby. Thirdly, the six switches S1, S2, S3, S4, S5 and S6 are continuous and function fast, which enables them to regulate the power consumption of the load bank 40 continuously and rapidly, such that the other problem of the existing load bank is solved, wherein the discrete mechanical switches cannot regulate the power consumption of the load bank continuously and rapidly.

The load bank 40 also includes three inductors L1, L2 and L3. The three inductors L1, L2 and L3 are respectively coupled between the three resistors R1, R2 and R3 and the output side of the controllable voltage source 42.

The consumption of the excess output power by the three resistors R1, R2 and R3 is achieved by regulating the voltage across the three inductors L1, L2 and L3 to control the voltage of load bank 40.

The voltage range and phase of load bank 40 are both controllable such that, it can be ensured the voltage of common AC bus 102 keeps stable.

Specifically, control device 60 comprises power to voltage conversion unit 62, subtractor 64 and control unit 66.

Power to voltage conversion unit 62 is configured to receive power command $P_{cmd}$ and to convert the power command $P_{cmd}$ into voltage command $V_{cmd}$. Subtractor 64 is configured to subtract the voltage command $V_{cmd}$ from a voltage of the load bank 40 to generate an error signal. Control unit 66 is configured to control operations of the six switches S1, S2, S3, S4, S5 and S6 based on the error signal to reduce the differences between the voltage command and the voltage of the load bank 40, specifically referring to the difference between the amplitudes of voltage command $V_{cmd}$ and load bank 40 voltage and the difference between the phases of voltage command and load bank 40 voltage.

Specifically, control unit 66 turns on and turns off the six switches S1, S2, S3, S4, S5 and S6 through six drives 46.

The content below explains how to obtain the voltage of load bank 40:

Specifically, control device 60 further comprises DQ conversion unit 68 and system 100 further comprises three sensors 402, 404 and 406. The three sensors 402, 404 and 406 are respectively coupled between the three resistors R1, R2, R3 and the three inductors L1, L2 and L3. The three sensors 402, 404 and 406 are configured to obtain the voltages at Point A, Point B and Point C. Point A refers to the connecting point between resistor R1 and inductor L1. Point B refers to the connecting point between resistor R2 and inductor L2. Point C refers to the connecting point between resistor R3 and inductor L3. Wherein, $VA=VL\sin(\omega t+\Phi)$, $VB=VL\sin(\omega t+\Phi+2/3\pi)$, $VC=VL\sin(\omega t+\Phi-2/3\pi)$. $f=\omega/2\pi$. The f refers to the frequency at which common AC bus 102 supplies AC power.

DQ conversion unit 68 is configured to implement DQ conversion of Point A voltage VA, Point B voltage VB and Point C voltage VC of the three sensors 402, 404 and 406, so as to obtain the voltage amplitude VL and the phase $\Phi$ of load bank 40.

Figure 3:
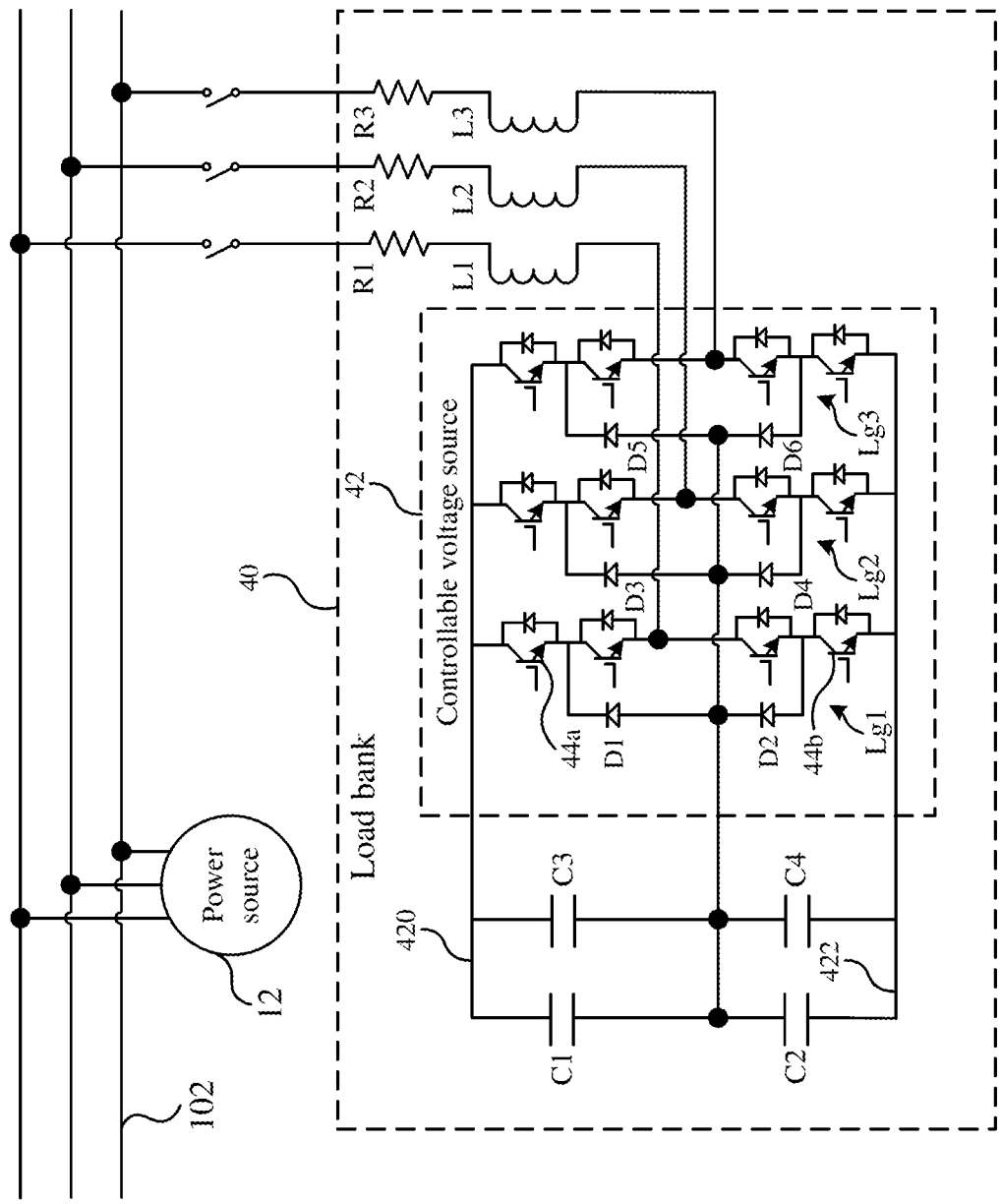
FIG. 3 is a circuit diagram of the load bank in the second embodiment.

Please refer to FIG. 3 as well, the circuit diagram of load bank 40 of the second embodiment. The difference between the load bank 40 in FIG. 3 and the load bank 40 in FIG. 2 is: the load bank 40 in FIG. 3 comprises 6 upper switches 44a, 6 lower switches 44b, 6 diodes D1, D2, D3, D4, D5, D6 and 4 capacitors C1, C2, C3 and C4.

The two upper switches 44a and the two lower switches 44b of the first group are connected in series between the first conductor wire 420 and the second conductor wire 422. The two upper switches 44a and the two lower switches 44b of the second group are connected in series between the first conductor wire 420 and the second conductor wire 422. The two upper switches 44a and the two lower switches 44b of the third group are connected in series between the first conductor wire 420 and the second conductor wire 422.

The two capacitors C1 and C2 are connected in series between the first conductor wire 420 and the second conductor wire 422. The two capacitors C3 and C4 are connected in series between the first conductor wire 420 and the second conductor wire 422.

The two upper switches 44a, the two lower switches 44b and the two diodes D1 and D2 of the first group constitute the first legged circuit Lg1. The two upper switches 44a, the two lower switches 44b and the two diodes D3 and D4 of the second group constitute the second legged circuit Lg2. The two upper switches 44a, the two lower switches 44b and the two diodes D5 and D6 of the third group constitute the third legged circuit Lg3.

The connecting point between the two upper switches 44a and the two lower switches 44b of the first group are coupled to the first inductor L1. The connecting point between the two upper switches 44a and the two lower switches 44b of the second group are coupled to the second inductor L2. The connecting point between the two upper switches 44a and the two lower switches 44b of the third group are coupled to the third inductor L3.

The two diodes D1 and D2 are connected in series between the connecting point of the two upper switches 44a and the connecting point of the two lower switches 44b of the first group.

The two diodes D3 and D4 are connected in series between the connecting point of the two upper switches 44a and the connecting point of the two lower switches 44b of the second group.

The two diodes D5 and D6 are connected in series between the connecting point of the two upper switches 44a and the connecting point of the two lower switches 44b of the third group.

The connecting point of the two diodes D1 and D2 is coupled between the two capacitors C1, C2 and the two capacitors C3, C4.

The connecting point of the two diodes D3 and D4 is coupled between the two capacitors C1, C2 and the two capacitors C3, C4.

The connecting point of the two diodes D5 and D6 is coupled between the two capacitors C1, C2 and the two capacitors C3, C4. It is possible to build a three-level circuit based on the content above.

In other embodiments, load bank 40 shown in FIG. 3 can be a three-level circuit of any form.

In other embodiments, the number of capacitor coupled between the first conductor wire 420 and the second conductor 422 can be one or more.

Figure 4:
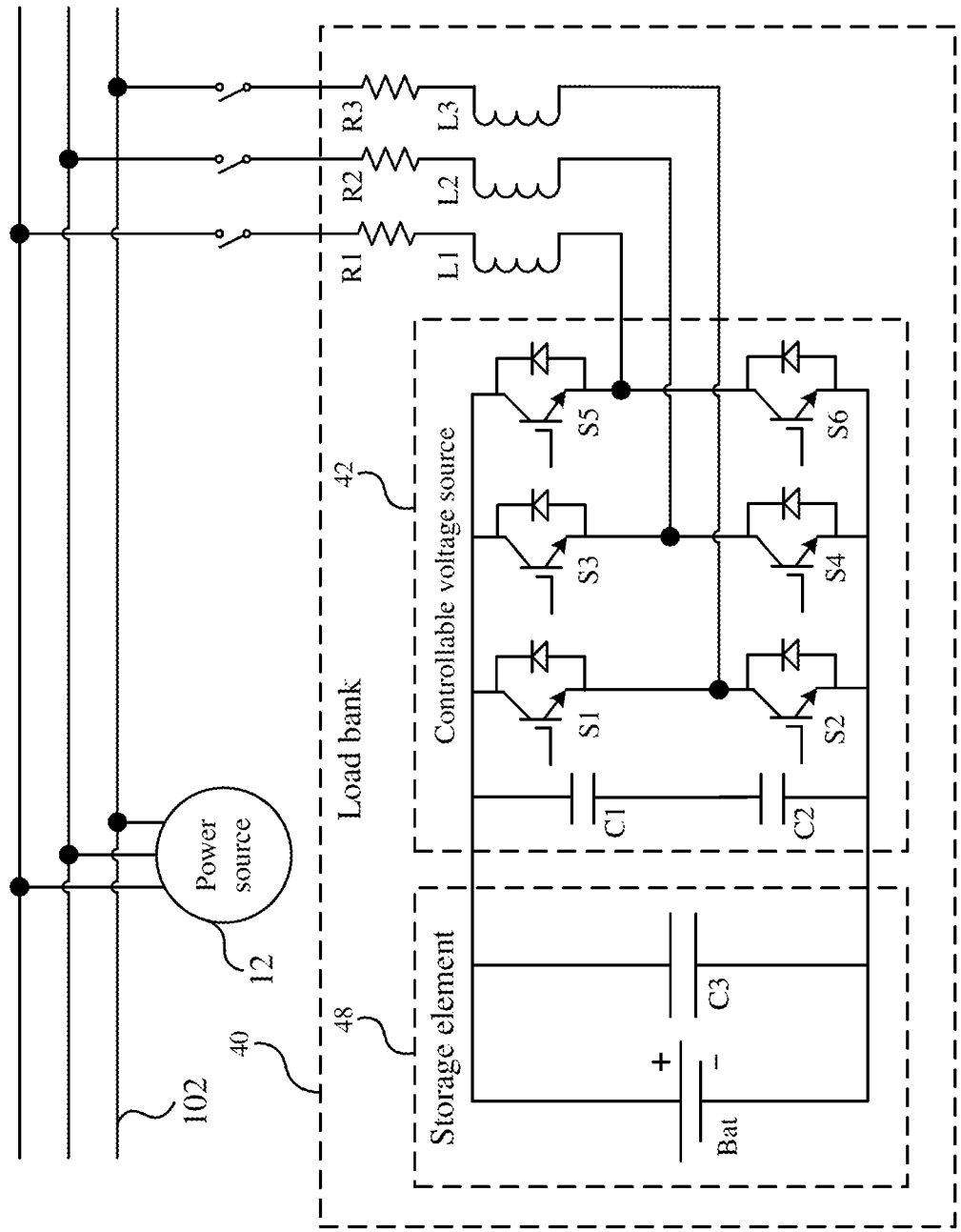
FIG. 4 is a circuit diagram of the load bank in the third embodiment.

Please refer to FIG. 4 as well, the circuit diagram of load bank 40 of the third embodiment. The difference between the load bank 40 in FIG. 4 and the load bank 40 in FIG. 2 is: the load bank 40 in FIG. 4 comprises storage element 48. The input side of controllable voltage source 42 is coupled to the storage element 48. In this embodiment, the storage element 48 comprises the capacitor C3, the battery Bat, or the combination thereof. The capacitor C3 herein is a general capacitor or a super capacitor. In one embodiment, the number of capacitor C3 can be one or more. Multiple capacitors can be connected in series, in parallel or in a manner of combination thereof. The number of battery Bat can also be one or more. The number of storage element 48 can be one or more.

Although the load bank 40 shown in FIG. 4 comprises three resistors R1, R2, and R3, in other embodiments, the load bank 40 shown in FIG. 4 may not include the three resistors R1, R2, and R3, wherein the three inductors L1, L2 and L3 of the load bank 40 shown in FIG. 4 are coupled between the output side of controllable voltage source 42 and the common AC bus 102.

Control device 60 shown in FIG. 2 is configured for controlling the six switches S1, S2, S3, S4, S5 and S6 during a first condition such that, to the extent that the output powers of the three power sources 12, 14 and 16 exceed the requisite powers of the four loads 20, 22, 24 and 26, any excess output power is supplied to storage element 48.

The control device 60 is further configured for controlling the switches S1, S2, S3, S4, S5 and S6 during the first condition such that, to the extent that the requisite powers of the four load 20, 22, 24 and 26 exceed the output powers of the three power sources 12, 14 and 16, any excess requisite power is supplied by the storage element 48.

The load bank 40 in this embodiment may supply power to the four loads 20, 22, 24 and 26 of the drill automatically. Therefore the problem is solved, wherein the existing load bank can only consume power by resistor and cannot supply power.

Figure 5:
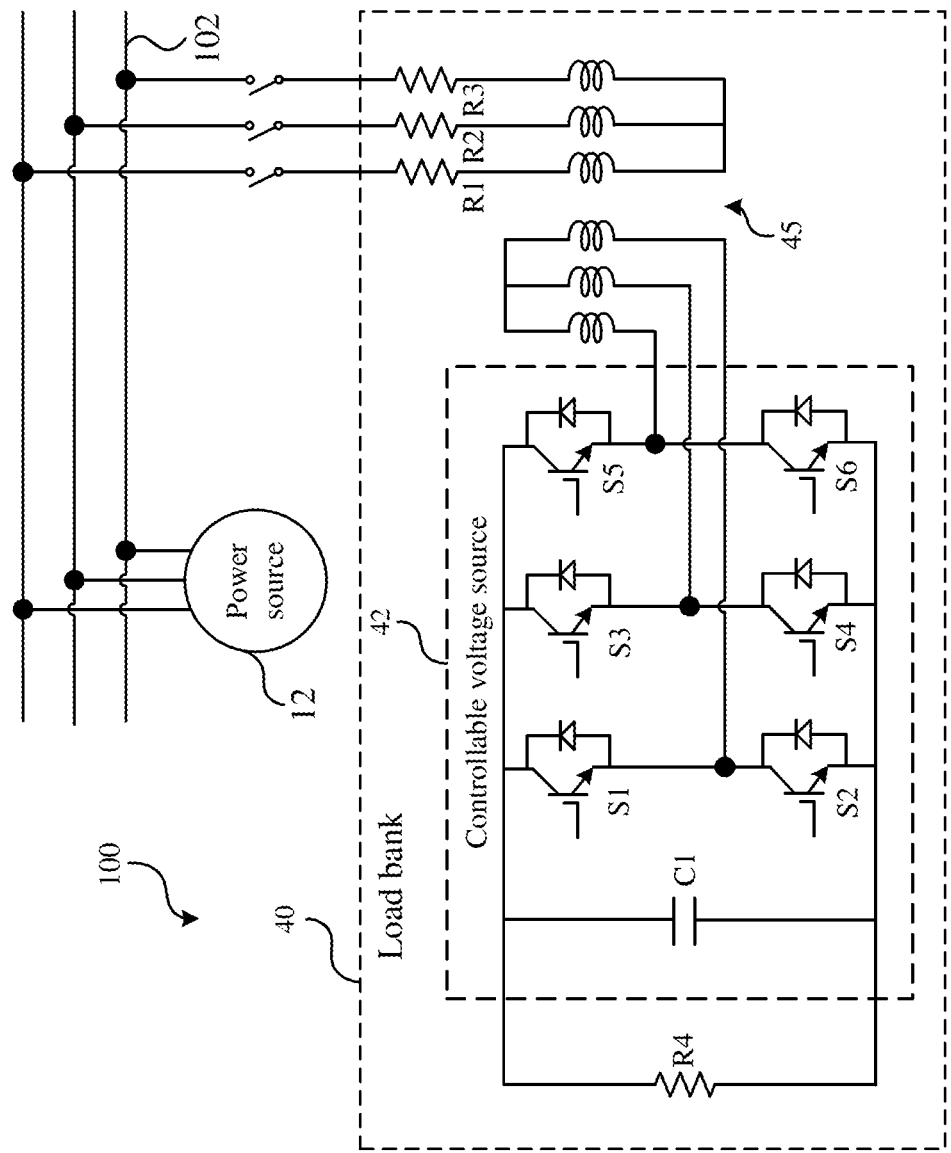
FIG. 5 is a circuit diagram of the load bank in the fourth embodiment.

Please refer to FIG. 5, the circuit diagram of load bank 40 of the fourth embodiment. The difference between the load bank 40 in FIG. 5 and the load bank 40 in FIG. 2 is: the load bank 40 shown in FIG. 5 comprises transformer 45 instead of the three inductors L1, L2, L3 of the load bank 40 shown in FIG. 3. As the transformer 45 may raise or reduce the voltage, it may meet different requirements.

Transformer 45 comprises three primary windings and three secondary windings magnetically coupled to the three respective primary windings, wherein the three primary windings are coupled to the output side of controllable voltage source 42, and wherein the three secondary windings are coupled to the three respective resistors R1, R2 and R3.

The input side of controllable voltage source 42 is further coupled to resistor R4 such that, the load bank 40 can consume the active power.

Figure 6:
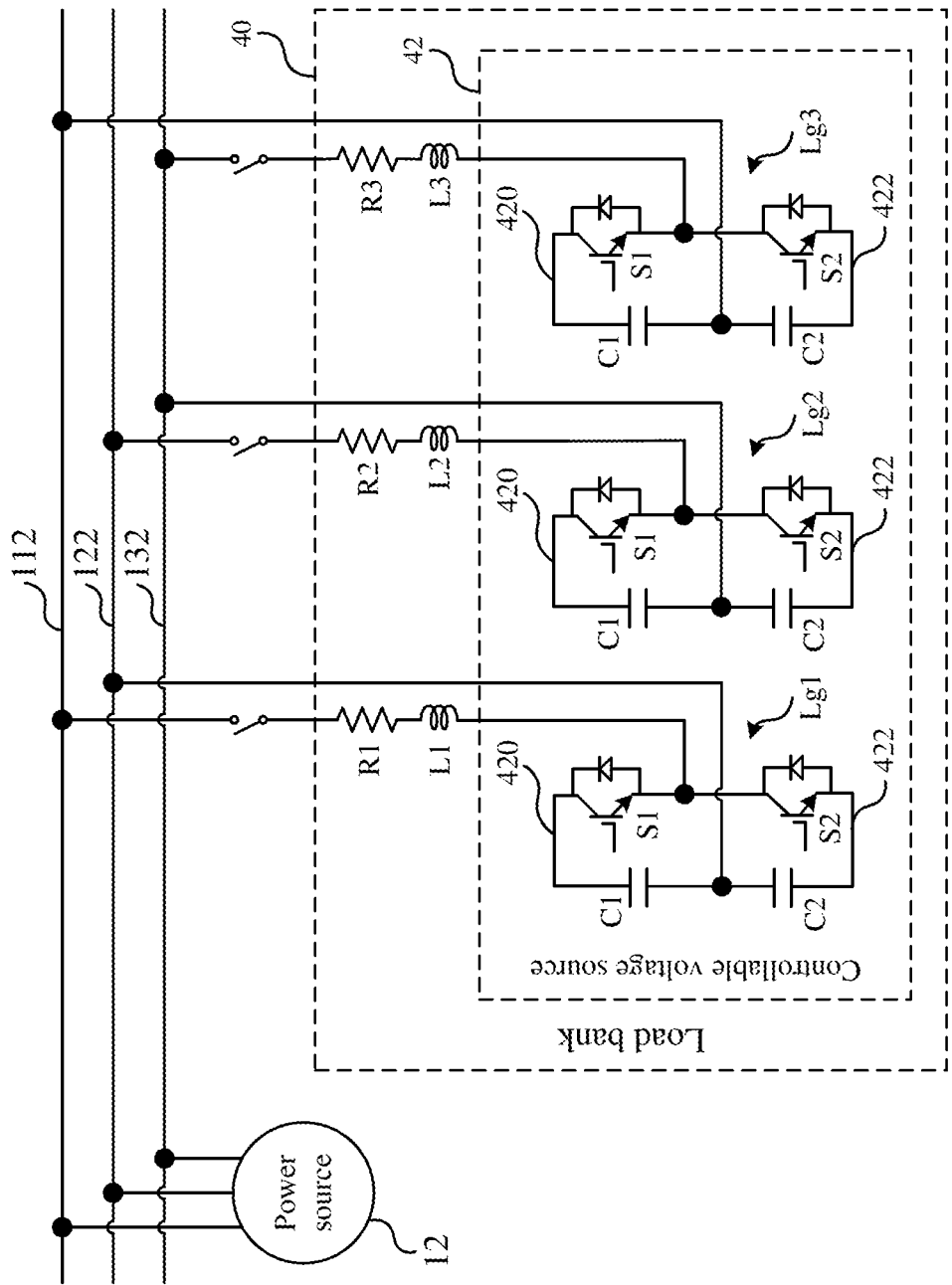
FIG. 6 is a circuit diagram of the load bank in the fifth embodiment.

Please refer to FIG. 6, the circuit diagram of load bank 40 of the fifth embodiment. The difference between the load bank 40 in FIG. 6 and the load bank 40 in FIG. 2 is: the controllable voltage source 42 of the load bank 40 shown in FIG. 6 comprises the first legged circuit Lg1, the second legged circuit Lg2 and the third legged circuit Lg3. The first legged circuit Lg1, the second legged circuit Lg2 and the third legged circuit Lg3 comprise two switches S1, S2 and two capacitors C1, C2 respectively. In other cases, the number of the switches and the capacitors can both be more than two. The two switches S1 and S2 are connected between the first conductor wire 420 and the second conductor wire 422 in series. The two capacitors C1 and C2 are connected in series between the first conductor wire 420 and the second conductor wire 422.

Inductor L1 and resistor R1 are coupled in series between the connecting point of the two switches S1, S2 included in the first legged circuit Lg1 and the first AC wire 112 of common AC bus 102. The connecting point of the two capacitors C1, C2 included in the first legged circuit Lg1 is coupled to the second AC wire 122 of common AC bus 102.

Inductor L2 and resistor R2 are coupled in series between the connecting point of the two switches S1, S2 included in the second legged circuit Lg2 and the second AC wire 122 of common AC bus 102. The connecting point of the two capacitors C1, C2 included in the second legged circuit Lg2 is coupled to the third AC wire 132 of common AC bus 102.

Inductor L3 and resistor R3 are coupled in series between the connecting point of the two switches S1, S2 included in the third legged circuit Lg3 and the third AC wire 132 of common AC bus 102. The connecting point of the two capacitors C1, C2 included in the second legged circuit Lg2 is coupled to the first AC wire 112 of common AC bus 102.

Figure 7:
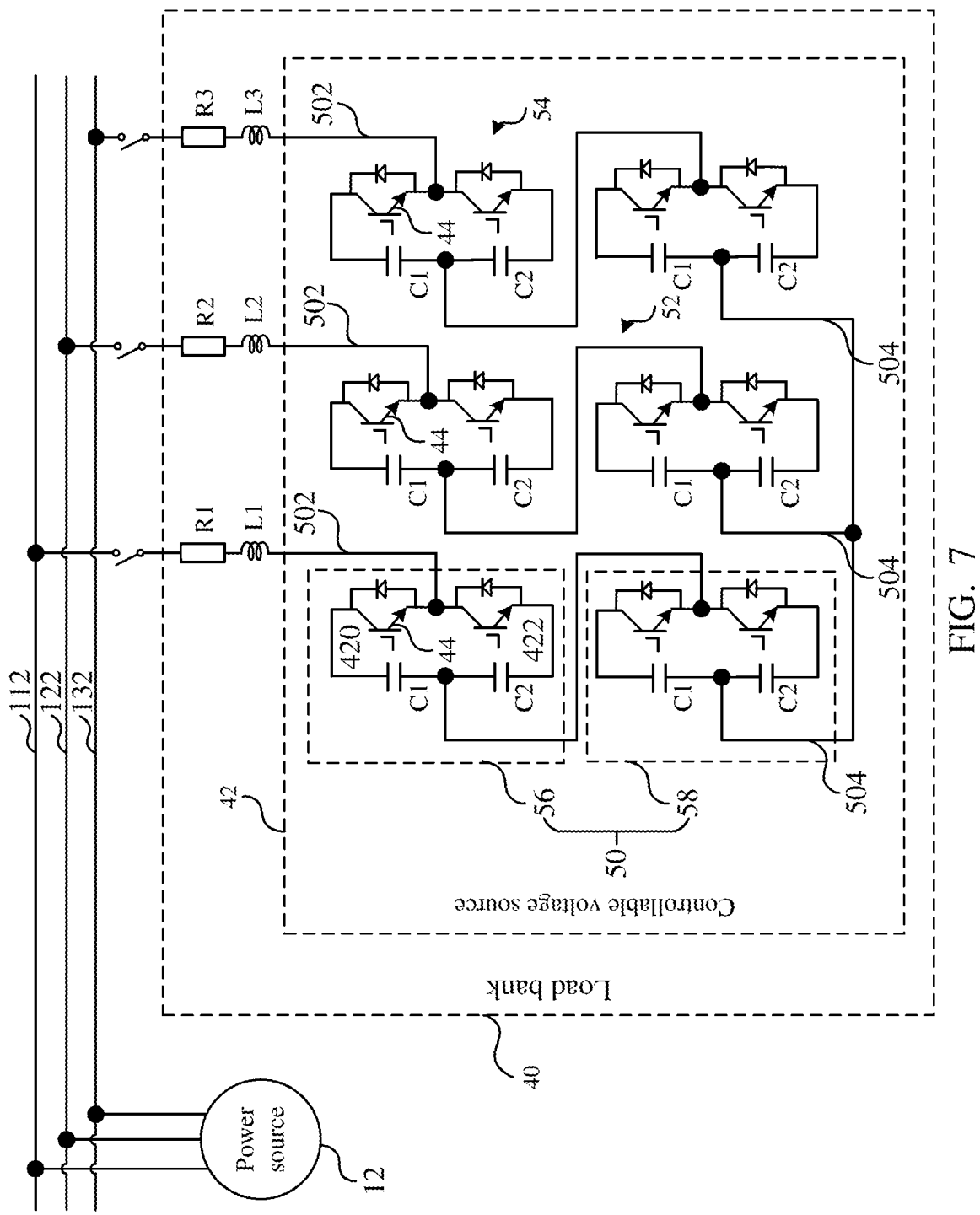
FIG. 7 is a circuit diagram of the load bank in the sixth embodiment.

Please refer to FIG. 7, the circuit diagram of load bank 40 of the sixth embodiment. The difference between the load bank 40 in FIG. 7 and the load bank 40 in FIG. 2 is: the controllable voltage source 42 of the load bank 40 shown in FIG. 7 comprises the first switch unit 50, the second switch unit 52 and the third switch unit 54. The first switch unit 50, the second switch unit 52 and the third switch unit 54 comprise two legged circuits 56 and 58, input end 502 and output end 504 respectively. The two legged circuits 56 and 58 comprise two switches 44 and two capacitors C1 and C2 respectively. The two switches 44 are connected between the first conductor wire 420 and the second conductor wire 422 in series. The two capacitors C1 and C2 are connected in series between the first conductor wire 420 and the second conductor wire 422. The connecting point between the two switches 44 is defined as input end 502. The connecting point between the two capacitors C1 and C2 is defined as output end 504.

Inductor L1 and resistor R1 are connected between the input end 502 of the first switch unit 50 and the first output phase line 112 of common AC bus 102 in series. The output end 504 of the first switch unit 50 is coupled to the output end 504 of the second switch unit 52 and the output end 504 of the third switch point 54.

Inductor L2 and resistor R2 are connected between the input end 502 of the second switch unit 52 and the second output phase line 122 of common AC bus 102 in series. The output end 504 of the second switch unit 52 is coupled to the output end 504 of the third switch point 54.

Inductor L3 and resistor R3 are connected between the input end 502 of the third switch unit 54 and the third output phase line 132 of common AC bus 102 in series.

It can be understood that, in other cases, the two legged circuits 56 and 58 may comprise more than two switches 44 and more than two capacitors ore one capacitor respectively.

It can also be under stood that, in other cases, the first switch unit 50, the second switch unit 52 and the third switch unit 54 may comprise more than two legged circuits 56 and 58 respectively.

Although the present invention is explained based on specific embodiments, it can be understood by those of the skills in this field that it can be modified in many ways. Therefore, it shall be noted that the intention of this Claims is to cover the modifications in the true conception and scope of the present invention.

What is claimed is:

1. A system for supplying power to at least one load, the at least one load coupled to at least one power source, the system comprising:
   a load bank coupled to the at least one power source and the at least one load, the load bank comprising a controllable voltage source comprising switches, at least three resistors coupled between an output side of the controllable voltage source and the at least one power source, and at least one storage element comprising one or more capacitors, batteries, or combinations thereof; and
   a control device for controlling the switches during a first condition such that, to the extent that an output power of the at least one power source exceeds a requisite power of the at least one load, any excess output power is either supplied to the at least one storage element or consumed by the at least three resistors, wherein the control device comprises:
      a power to voltage conversion unit for receiving a power command and converting the power command to a voltage command;
      a subtractor for subtracting the voltage command from a voltage of the load bank; and
      a control unit for generating switching commands for controlling operations of the switches to reduce a difference between the voltage command and the voltage of the load bank.

2. The system of claim 1, wherein the at least one power source is configured for providing the output power on three output phase lines; and
   wherein each of the at least three resistors 1s coupled between the output side of the controllable voltage source and a respective one of the output phase lines.

3. The system of claim 1, wherein the load bank further comprises three inductors coupled between the at least three respective resistors and the output side, wherein the excess output power consumed by the at least three resistors is achieved by controlling the voltage of the load bank through regulating the voltage across the inductors.

4. The system of claim 1, wherein the at least one storage element is coupled to an input side of the controllable voltage source, and wherein the control device is further configured for controlling the switches during the condition such that, to the extent that the requisite power exceeds the output power, any excess requisite power is supplied by the at least one storage element.

5. The system of claim 1, wherein the control device is further configured to turn off the switches during a second condition, such that the controllable voltage source is disabled.

6. The system of claim 1, wherein the load bank further comprises a transformer including three primary windings and three secondary windings magnetically coupled to the three respective primary windings, wherein the three primary windings are coupled to the output side, and wherein the three secondary windings are coupled to the at least three respective resistors.

7. The system of claim 1, further comprising a common AC bus coupled to the at least one power source, a common DC bus coupled to the at least one load, and a rectifying unit coupled between the common AC bus and the common DC bus, wherein the at least three resistors are coupled between the output side and the common AC bus, and wherein the rectifying unit is configured for rectifying an AC output power of the at least one power source to an DC output power that is supplied to the common DC bus.

8. The system of claim 1, wherein the controllable voltage source comprises a DC to AC converter.

9. A method for supplying power to at least one load that is coupled to at least one power source, the at least one load and the at least one power source coupled to a load bank, the load bank comprising a controllable voltage source comprising switches, at least three resistors coupled between an output side of the controllable voltage source and the at least one power source, and at least one storage element comprising one or more capacitors, batteries, or combinations thereof, the method comprising:
receiving a power command and converting the power command to a voltage command;
subtracting the voltage command from a voltage of the load bank;
generating switching commands for controlling operations of the switches to reduce a difference between the voltage command and the voltage of the load bank; and
controlling the switches during a first condition such that, to the extent that an output power of the at least one power source exceeds a requisite power of the at least one load, any excess output power is either supplied to the at least one storage element or consumed by the at least three resistors.

10. The method of claim 9, wherein the load bank further comprises three inductors coupled between the at least three respective resistors and the output side, and wherein the method further comprises:
controlling the voltage of the load bank through regulating the voltage across the inductors to achieve the excess output power that is consumed by the at least three resistors.

11. The method of claim 9, wherein the at least one power source is configured to provide the output power on three output phase lines, and wherein each of the at least three resistors is coupled between the output side of the controllable voltage source and a respective one of the output phase lines.

12. The method of claim 9, wherein the at least one storage element is coupled to an input side of the controllable voltage source, and wherein the method further comprises:
controlling the switches during the first condition such that, to the extent that the requisite power exceeds the output power, any excess requisite power is supplied by the at least one storage element.

13. The method of claim 9, further comprising:
turning off the switches during a second condition, such that the controllable voltage source is disabled.

14. The method of claim 9, wherein the at least one power source is coupled to a common AC bus, the at least one load is coupled to a common DC bus, the at least three resistors are coupled between the output side and the common AC bus, and wherein the method further comprises:
rectifying an AC output power of the at least one power source to an DC output power that is supplied to the common DC bus.

15. The method of claim 9, further comprising:
providing an DC to AC converter in the controllable voltage source.

16. A system for supplying power to at least one load that is coupled to at least one power source, the system comprising:
a control device for controlling a plurality of switches of a controllable voltage source of a load bank during a first condition such that, to the extent that an output power of the at least one power source exceeds a requisite power of the at least one load, any excess output power is either supplied to the at least one storage element or consumed by at least three resistors of the load bank, the at least three resistors coupled between an output side of the controllable voltage source and the at least one power source, wherein the control device comprises:
a power to voltage conversion unit for receiving a power command and converting the power command to a voltage command;
a subtractor for subtracting the voltage command from a voltage of the load bank; and
a control unit for generating switching commands for controlling operations of the switches to reduce a difference between the voltage command and the voltage of the load bank.

17. The system of claim 16, wherein the load bank further comprises three inductors coupled between the at least three respective resistors and the output side, and wherein the excess output power consumed by the at least three resistors is achieved by controlling the voltage of the load bank through regulating the voltage across the inductors.

18. The system of claim 16, wherein the at least one power source is configured for providing the output power on three output phase lines; and
wherein each of the at least three resistors is coupled between the output side of the controllable voltage source and a respective one of the output phase lines.

19. The system of claim 16, wherein the at least one storage element is coupled to an input side of the controllable voltage source, and wherein the control device is further configured for controlling the switches during the first condition such that, to the extent that the requisite power exceeds the output power, any excess requisite power is supplied by the at least one storage element.

* * * * *